May 2, 1967 — R. W. JAHIMIAK — 3,316,981

TRACTOR PLOW

Filed March 12, 1965 — 2 Sheets-Sheet 1

Inventor
Ralph W. Jahimiak
By Kenneth Luckert
Attorney

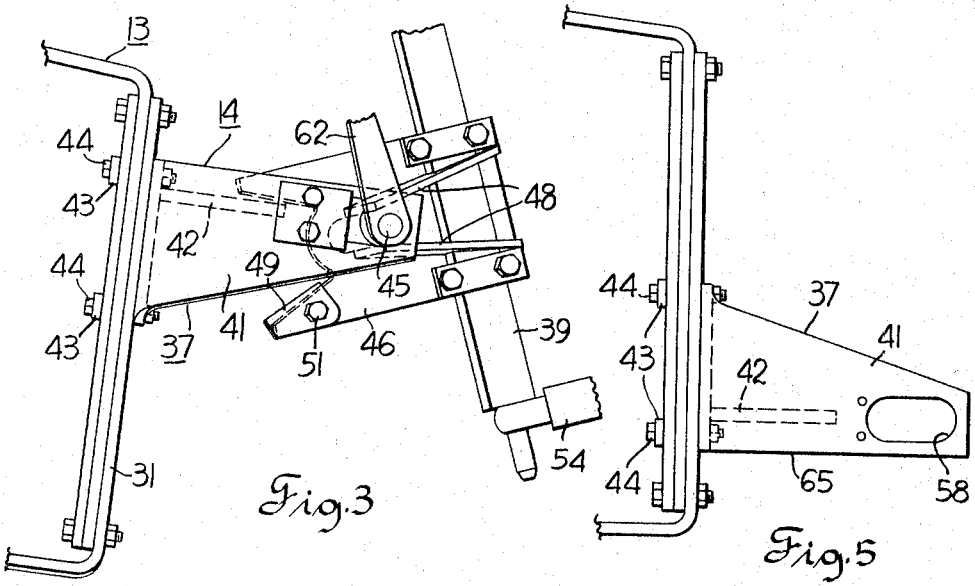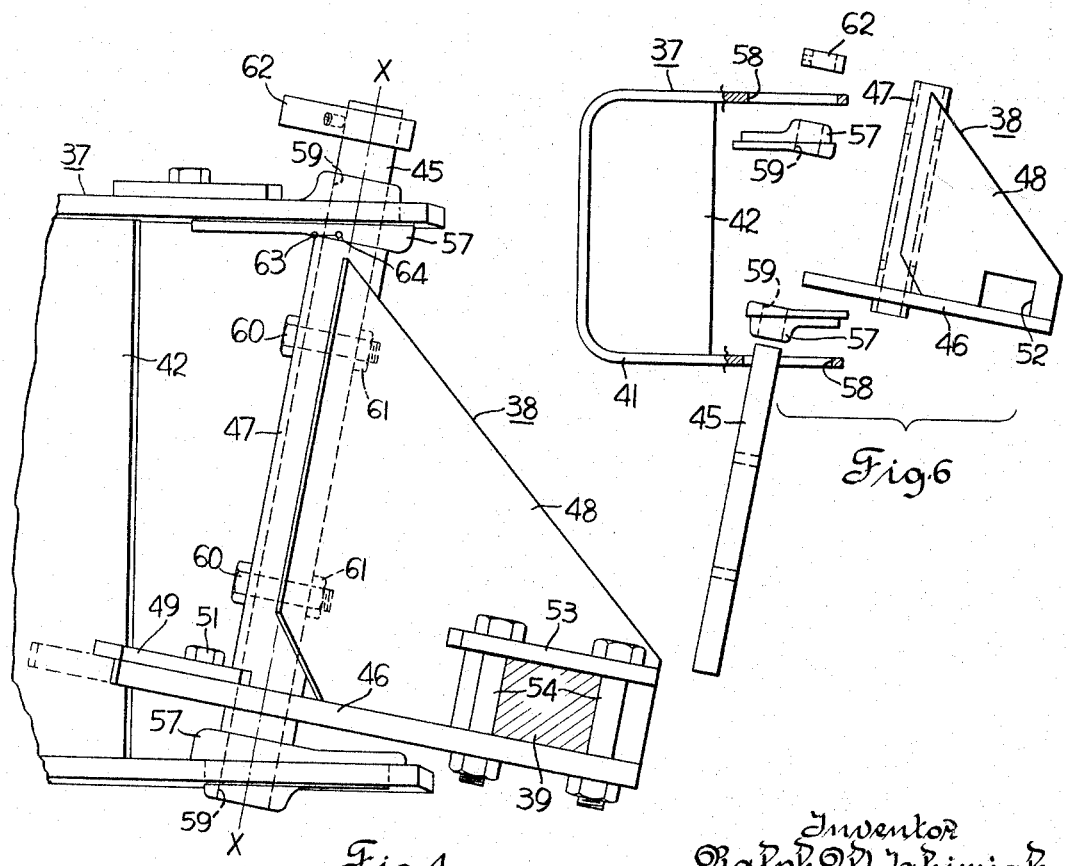

United States Patent Office 3,316,981
Patented May 2, 1967

3,316,981
TRACTOR PLOW
Ralph W. Jahimiak, La Crosse, Wis., assignor to Allis-Chalmers Manufacturing Company, Milwaukee, Wis.
Filed Mar. 12, 1965, Ser. No. 439,383
2 Claims. (Cl. 172—255)

This invention relates to a novel connection of an agricultural implement to a tractor for towing of the implement and more particularly to an improved mechanism for mounting and connecting a semi-mounted, multi-bottom plow to a tractor which permits ready turning without interference.

In the prior art when six and seven bottom semi-mounted plows are raised into transport position and supported by the tractor and a rear plow wheel, the lateral extent of the plow and the position of the supports are such that when the tractor is turned in one direction the amount of overhang and weight of the plow is sufficient to cause one side of the plow to droop until the front bottom may even strike the ground. This is, of course, undesirable and may even result in damage to the plow.

Accordingly, it is the main object of this invention to provide connecting means between a tractor and semi-mounted plow which counteracts the aforementioned tendency for the plow to droop when the tractor is turned in one direction.

It is a further object of this invention to provide a semi-mounted plow adapted to be used in a conventional manner with one wheel of the towing tractor operating in the furrow and which plow can readily be adjusted so that plowing operations can be handled thereby with both tractor drive wheels operating on the land.

It is a further object of this invention to provide means in a semi-mounted plow which can be operated in a conventional manner with one drive wheel of the tractor operating in the furrow and which plow can be adjusted to operate with both drive wheels of the tractor on land and such means is effective with either adjustment of the plow for preventing droop of a forward portion of the plow when said tractor makes a turn in one direction during transport.

The invention also includes the following novel features and details of construction, to be hereinafter more fully described, illustrated in the accompanying drawings and specifically pointed out in the claims hereunto appended.

In the drawings:

FIG. 3 is an enlarged portion of FIG. 2 with the tractor making a left hand turn;

FIG. 4 is an enlarged portion of FIG. 1 showing some of the details of construction;

FIG. 5 is an enlarged detail similar to FIG. 2 showing the positioning of one part of the plow when used for operation with only one of the tractor drive wheels positioned on the land; and FIG. 6 is an enlarged side elevation of a portion of the plow showing the various parts separated which form the pivot connection between plow and tractor.

Referring to the drawings, like characters of reference denote the corresponding parts throughout the several views.

Figure 1:
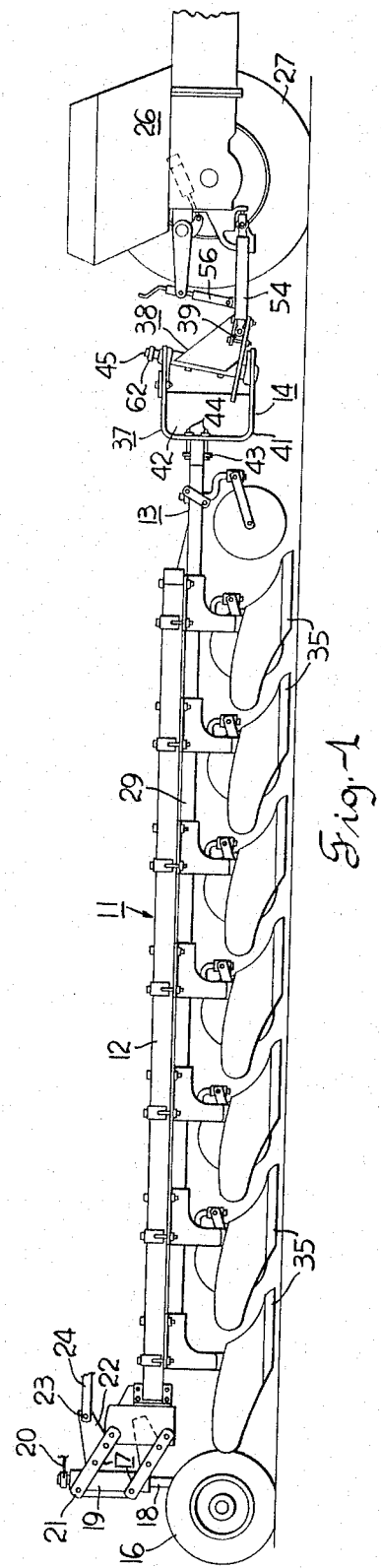
FIG. 1 is a side elevation of a semi-mounted, multi-bottom plow connected to a tractor partially shown and wherein this invention is embodied.
Figure 2:
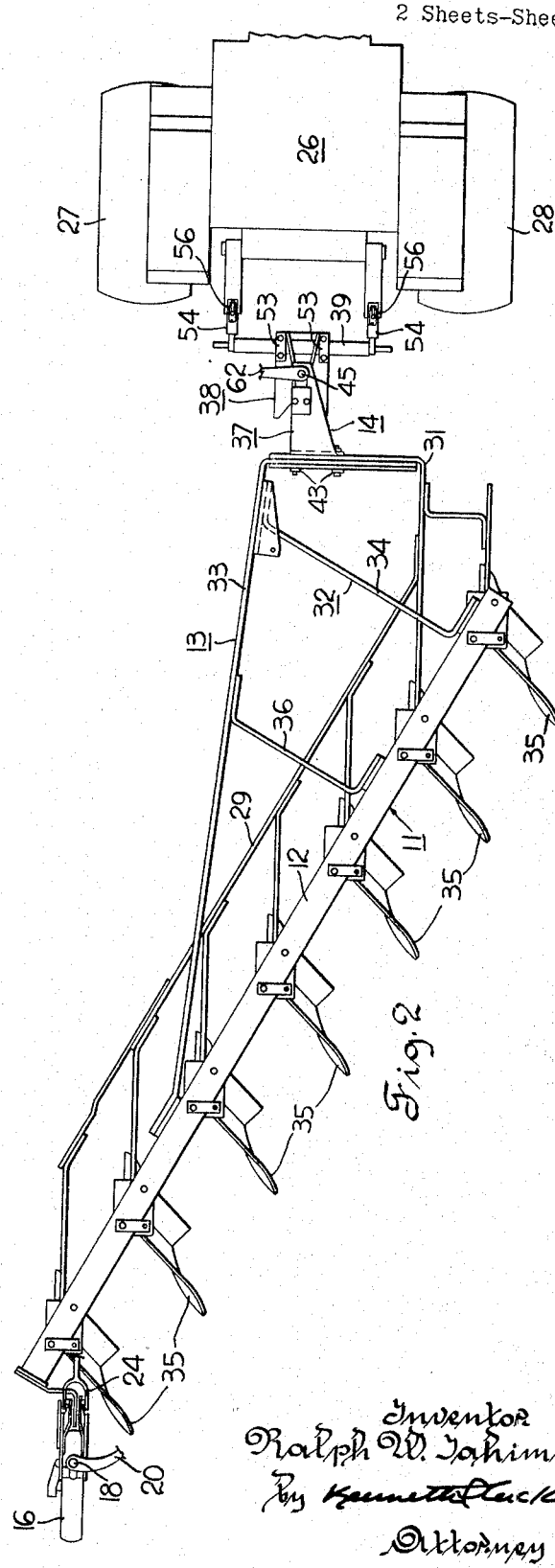
FIG. 2 is a plan view of FIG. 1 showing the combination arranged for operating with both tractor drive wheels operating on the land.

Referring now to FIGS. 1 and 2, a semi-mounted, multi-bottom plow is generally indicated by reference numeral 11 and includes a diagonal support tube 12, frame structure 13 rigidly connected to tube 12 and a hitch structure 14 detachably connected to the forward end of frame 13. The usual steerable rear wheel 16 is attached to the rear end of tube 12 by means of a conventional parallelogram linkage 17. The spindle 18 of wheel 16 is pivotally received in tube 19 of linkage 17 and an arm 20 is attached to the upper end of spindle 18 for movement therewith for steering purposes as will be further described at a later point in this description.

The upper link 21 of parallelogram linkage 17 is provided with a plate 22 attached thereto which receives a pivot pin 23 carried by the rear arm 24 of a remote ram hydraulic system carried by the plow frame and adjusted from a tractor 26. The details of the hydraulic system are conventional and not shown and form no part of this invention; it being sufficient to state that when the tractor hydraulic system is actuated, the position of wheel 16 relative to tube 12 will be adjusted and thereby the position of tube 12 relative to the ground.

As shown in FIGS. 1 and 2, plow 11 and tractor 26 are adjusted for plowing with both wheels 27 and 28 of tractor 26 operating on the land.

Frame structure 13 attached to tube 12 includes a lower frame 29 and extends forwardly to provide a transverse hitch mounting frame portion 31 which is strengthened by an upper truss frame 32 which consists of a relatively long forwardly extending member 33 and two brace members 34 and 36. A series of seven plow bottoms 35 are attached to tube 12 by conventional means.

The hitch structure 14 consists generally of a pivot bracket 37, pivot assembly 38 and a transverse lift bar 39. The fabricated pivot bracket 37 includes a U-shaped member 41 having a vertically extending gusset member 42 attached thereto for reinforcement. The bracket is adjustably secured to the forward transverse plow frame structure 31 by means of straps 43 and bolts 44. The pivot bracket 37 can be adjusted vertically relative to the plow frame by means of a series of vertically spaced holes (not shown) in the rearward vertical portion of bracket 37. Pivot bracket 37 is also transversely adjustable which adjustment is accomplished by loosening bolts 44 and sliding the bracket along transverse frame member 31 and then retightening bolts 44. FIG. 5, for example, shows bracket 37 in an adjusted position different from that shown in FIG. 2.

Fabricated pivot assembly 38 is received by the pivot bracket 37 and is arranged to pivot about the longitudinal axis $x—x$ of a forwardly inclined pivot post 45 (see FIG. 4). The pivot assembly 38 includes a base plate 46 to which is attached a barrel member 47 and two gusset plates 48 which are attached to barrel member 47 and to base plate 46. Base plate 46 is provided with a stop member 49 which is attached to the rearward portion thereof by means of bolt 51. The stop member 49 contacts gusset member 42 of the pivot bracket 41 to limit the movement of the assembly 38 relative to the bracket 41. The gusset plates 48 are provided with rectangular openings 52 (FIG. 6) which adjustably receive lift bar 39 (FIG. 4). Lift bar 39 can be laterally adjusted relative to pivot assembly 38 and fixed in its adjusted position by means of clamps 53 and bolts 51. The outer trunnion ends of lift bar 39 are connected to the tractor draft arms 54 (FIGS. 1 and 2) in a conventional manner. The plow is winged or laterally leveled by means of adjustable tractor links 56.

It should now be apparent that the present plow hitch can be laterally adjusted relative to the lift bar 39 and that the plow frame can be laterally shifted relative to the hitch. This dual lateral adjustment provides a sufficient range of adjustment to accommodate both on land and in furrow plowing.

Referring to FIGS. 4 and 6, the pivot post 45 is journaled in two bearings 57 which are received in oval shaped openings 58 (see FIG. 5) in upper and lower portions of U-shaped member 41. Bearings 57 (FIGS. 4 and 6) are identical and interchangeable. The bearings are provided with openings 59 which are angled with respect to their mounting surface and pivotally receive the pivot post 45. By virtue of the angled openings 59 in the bearings 57 the pivot post and the associated pivot assembly 38 are inclined forwardly i.e., the upper portion of the assembly is closer to tractor 26 than the lower portion of the assembly, or in other words the plow is pivotally mounted for movement about a forwardly inclined axis. It should be understood that when the plow is being transported and the tractor turned to the left, the plow pivoting about the inclined axis $x-x$ will cause the right forward side of the plow to be tilted upwardly thereby counteracting the tendency of the plow to tilt downwardly at its forward overhung end and perhaps drag on the ground.

Pivot post 45 is attached to barrel member 47 by means of bolts 60 and nuts 61 (FIG. 4). The upper end of post 45 has an arm 62 attached thereto which is suitably connected by means (not shown) to arm 20 which is attached to the upright spindle of wheel 16 so that wheel 16 is steered by the movement of pivot post 45 in a conventional manner.

FIG. 4 demonstrates the action of pivoting in the hitch which results in this raising action on the right hand side of the plow when a left hand turn is being made. When the plow is being moved forwardly, point 63 on barrel member 47 will be as shown. When tractor 26 has turned left, point 63 will have moved to point 64 because the tractor lift arms are maintaining lift bar 39 at a fixed height. Accordingly, upper bearing 57 and the structure of the front end of the plow associated therewith will have moved upwardly a distance equal to the vertical spacing between point 64 and the lower edge of bearing 57. The effect of this lift will, of course, be multiplied at the forward plow bottom thereby overcoming any sag that might be present.

Referring to FIG. 5 it is here shown, with parts removed for clarity, the position of the hitch when the plow is to be used with the tractor operating with its right wheel 28 in the furrow. When such operation is desired pivot assembly 38 is disassembled from pivot bracket 37. U-shaped member 41 is then removed from the plow frame and inverted so that straight edge 65 is now at the right and member 41 is then reattached adjacent the right hand end of the plow frame. Pivot assembly 38 is then reassembled in the pivot bracket and the plow and tractor are now adapted for in furrow plowing. It is to be noted that whether the plow and tractor are set up for on land or in furrow plowing, the pivot axis $x-x$ inclination will remain the same and thereby affording a lifting action to the right hand overhung portion of the plow when a left hand turn is being made by the tractor when transporting the plow.

In accordance with the patent statutes, I have described the principles of construction and operation of my improved plow hitch, and while I have endeavored to set forth the best embodiment thereof, I desire to have it understood that obvious changes may be made within the scope of the following claims without departing from the spirit of my invention.

The embodiments of the invention for which an exclusive property or privilege is claimed are defined as follows:

1. A semi-mounted, multi-bottom plow adapted to be attached at its forward end to lift arms of a tractor in supported relation thereto and having an adjustable height rear wheel attached to said plow in supporting relation thereto, the improvement comprising said plow being provided with a horizontally extending transverse lift bar at the forward end thereof, said lift bar being provided with trunnions at the ends thereof for connection to said lift arms, said plow including a frame for supporting a plurality of plow bottoms and including a forwardly facing U-shaped pivot bracket carried by the forward end of said frame, said lift bar being attached to a generally vertically extending pivot member, said pivot member being pivotally received at its ends within bearings carried by upper and lower portions of said bracket, the longitudinal axis of said pivot member being inclined forwardly with the upper end of said pivot member closer to the attached tractor than the lower end thereof so that when said tractor turns relative to said plow in one direction the forward plow bottom is elevated, and wherein said plow may be adjusted relative to said tractor wherein said tractor may be operated entirely on land for plowing or with one drive wheel in the furrow and wherein such adjustment is achieved by turning said channel member upside down and laterally shifting same on the forward end of said frame without changing the inclination of said longitudinal axis and wherein said bearings are interchangeable.

2. A semi-mounted, multi-bottom plow including a fore-and-aft extending frame supported at its rear end on a steerable wheel and adapted to be supported at its front end on transversely spaced lift arms of a tractor, the improvement comprising said frame being provided with a lift bar at the forward end thereof with the ends of said lift bar being supported by said lift arms for pivotal movement about a generally horizontal transverse axis, said frame including a forwardly facing channel bracket carried by a forward portion of said frame, a midportion of said lift bar being attached to a generally vertically extending pivot member, said pivot member being received at its ends in upper and lower portions of said bracket for pivotal movement relative to said bracket, the longitudinal axis of said pivot member being inclined forwardly so that when said tractor turns relative to said plow in one direction the forward plow bottom is elevated, and wherein said plow may be adjusted relative to said tractor wherein said tractor may be operated entirely on land for plowing or with one drive wheel in the furrow and wherein such adjustment is achieved by turning said channel member upside down and laterally shifting same on the forward end of said frame without changing the inclination of said longitudinal axis.

References Cited by the Examiner

UNITED STATES PATENTS

| | | | |
|---|---|---|---|
| 2,322,342 | 6/1943 | Bunn | 172—285 X |
| 3,061,020 | 10/1962 | Mannheim | 172—417 X |

ABRAHAM G. STONE, *Primary Examiner.*

J. R. OAKS, *Assistant Examiner.*